Aug. 25, 1953

J. W. WAKLEY 2,650,142

JOURNAL ASSEMBLY

Filed May 4, 1951

INVENTOR
John W. Wakley

BY

ATTORNEYS

Patented Aug. 25, 1953

2,650,142

UNITED STATES PATENT OFFICE 2,650,142

JOURNAL ASSEMBLY

John W. Wakley, Modesto, Calif., assignor of one-half to Emery F. Wakley, Modesto, Calif.

Application May 4, 1951, Serial No. 224,606

2 Claims. (Cl. 308—237)

This invention is directed to, and it is a major object to provide, an improved journal or bearing assembly especially designed, but not limited, for use in internal combustion engines of the reciprocating type, as in motor vehicles.

Another object of the present invention is to provide a novel removable and replaceable sectional wear sleeve for the shaft in a journal assembly whereby upon the wearing surface becoming worn, it is not necessary to remove and machine the shaft. This is of extreme advantage in motor vehicle engines, as it permits of crankshaft reconditioning without removing the crankshaft from the engine.

A further object of this invention is to provide the journal assembly with novel locator means to prevent the sectional wear sleeve from rotating on the shaft, yet which permits of ready removal of the wear sleeve sections while the shaft remains in place.

An additional object of the invention is to provide a wear sleeve, for the purpose described, which does not interfere with lubrication of the journal assembly from the passage from which oil is normally fed under pressure to said assembly from the shaft.

It is also an object of the invention to provide a sectional wear sleeve, for a journal assembly, which is designed for ease and economy of manufacture and facility of installation in, or removal from, said assembly.

Still another object of the invention is to provide a practical and reliable wear sleeve, for a journal assembly, and one which will be exceedingly effective for the purpose for which it is designed.

These objects are accomplished by means of such structure and relative arrangement of parts as will fully appear by a perusal of the following specification and claims.

Figure 1:
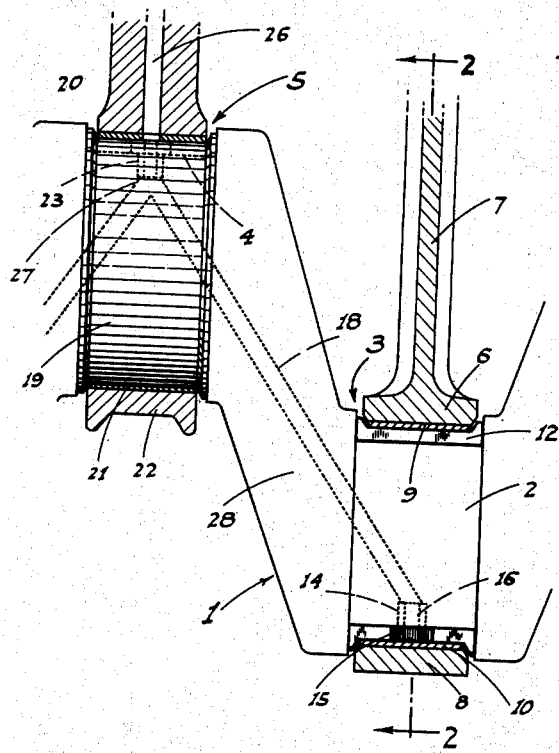
Fig. 1 is a fragmentary sectional elevation, showing a main bearing and a connecting rod bearing, of a crankshaft, embodying the present invention; the near, wear sleeve section being detached from the connecting rod bearing.
Figure 3:
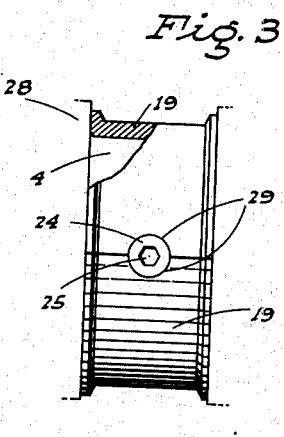
Fig. 3 is a side elevation of the wear sleeve as formed for use in a main crankshaft bearing.
Figure 2:
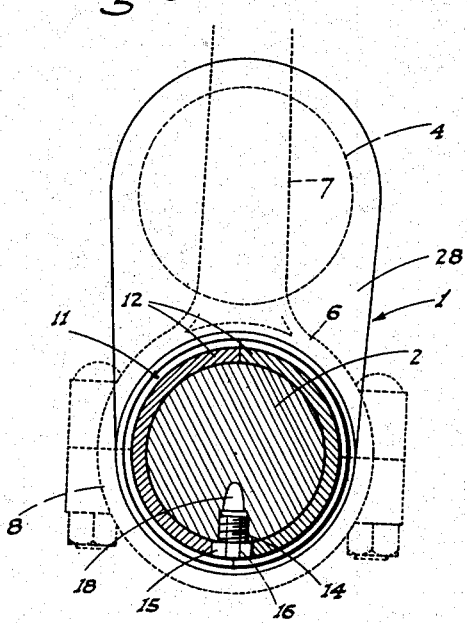
Fig. 2 is a cross section on line 2—2 of Fig. 1.
Figure 4:
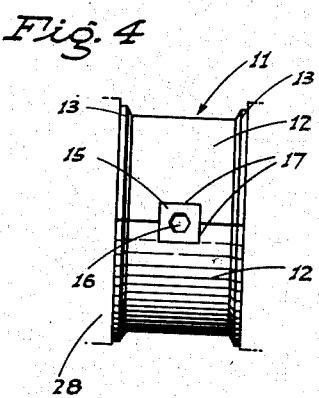
Fig. 4 is a similar view, but shows the wear sleeve as formed for use in a connecting rod bearing.

Referring now more particularly to the characters of reference on the drawings, the numeral 1 indicates generally a crankshaft, which crankshaft includes a shaft 2 in a connecting rod bearing 3, and a similar shaft 4 in a main bearing 5.

The connecting rod bearing 3 includes an upper half 6 fixed with the connecting rod 7, and a removable lower half 8; such halves having bearing liners 9 and 10 therein, respectively.

The outside diameter of the shaft 2 is substantially lesser than the inside diameter of the connecting rod bearing liner comprised of halves 9 and 10.

Between the shaft 2 and the connecting bearing liner, the journal assembly includes a wear sleeve, indicated generally at 11, such wear sleeve being comprised of a pair of 180° sections 12 which abut in matching relation at adjacent ends. This wear sleeve engages, in matching relation and with a close working fit between the shaft 2 and the connecting rod bearing liner 9—10.

The wear sleeve 11 is formed, at opposite ends, with shoulders 13 for retention of the connecting rod bearing 6 against undue endwise play.

The wear sleeve 11 is retained against rotation on the shaft 2 by locator means, as follows:

A set screw 14 is threaded radially into the shaft 2, and said set screw is formed at its outer end with a rectangular head 15 of a thickness substantially that of the wear sleeve 11; such head having a socket 16 therein for the reception of an Allen wrench. When the set screw 14 is run into position, the half sections 12 of the wear sleeve 11 are engaged on the shaft 2; said sections being formed at the related adjacent ends with notches 17 which register to define an opening into which said head 15 engages in matching relation. The head has a curvature such that its outer surface is flush with, and matches, the rounded surface of the wear sleeve 11.

To place or remove the sectional wear sleeve 11, it is only necessary that the halves 6 and 8 of the connecting rod bearing 3 be separated, whereby the sleeve sections may be manipulated relative to the shaft 2 without restriction by the locator head 15.

In order to not obstruct oil pressure lubrication of the journal assembly, the socket 16 of the set screw 14 extends completely through said screw axially, registering with the conventional oil feed passage 18 which extends into the shaft 2; oil under pressure thus feeding through the screw 14 to working surfaces of the journal assembly.

With a sectional wear sleeve 11 constructed and located against rotation on the shaft 2, as described, an effective wear member is provided, but when worn—by reason of long usage—such sleeve can be removed and replaced with a minimum of labor and expense; the shaft 2 never becoming out of round, as it is not subject to direct wear.

The wear sleeve 11 has been described, as above, with respect to its embodiment in a connecting rod bearing 3.

In a main bearing 5 a similar sectional wear sleeve 19 is employed between the shaft 4 and the main bearing liner comprised of an upper half 20 and a lower half 21.

When the sectional wear sleeve 19 is used in a main bearing 5, wherein the removable lower half 22 of such bearing is the only part which can be shifted, relative to the shaft 4, the set screw 23 must be formed with a circular head 24; this for the reason that the set screw must be removed before both of the sections of the wear sleeve 19 can be turned sufficiently to escape the upper half of the main bearing 5.

The circular head 24 is formed with a socket 25 for the reception of an Allen wrench, and—as before—such socket extends axially through the set screw, whereby to establish communication with the oil feed passage 26 leading to the main bearing 5, and connection with the oil feed passage 18 in the shaft 4, as at 27; the feed passage 18 extending through the corresponding crank arm 28 between shafts 2 and 4.

To accommodate the circular head 24, the related adjacent ends of the sections of wear sleeve 19 are formed with half-circle notches 29 in register, forming a circular opening in which said circular head 24 engages in matching relation. Also, the face of said head 24 is curved to match the curvature of the wear sleeve.

The described invention provides a very practical and reliable wear member on the shaft of a journal assembly, which wear member—in the form of a sectional wear sleeve—is capable of easy and economical manufacture and ready installation or removal.

From the foregoing description it will be readily seen that there has been produced such a device as substantially fulfills the objects of the invention, as set forth herein.

While this specification sets forth in detail the present and preferred construction of the device, still in practice such deviations from such detail may be resorted to as do not form a departure from the spirit of the invention, as defined by the appended claims.

Having thus described the invention, the following is claimed as new and useful, and upon which Letters Patent are desired:

1. In a journal assembly which includes a shaft and a two-part bearing about the shaft, each part having a wearing surface therein of greater inside diameter than the outside diameter of the shaft; a wear sleeve surrounding the shaft in matching relation and engaged between the shaft and said wearing surfaces with a close working fit, said wear sleeve being comprised of initially separate half sections abutting at adjacent ends, and a locator element projecting radially from the shaft, said locator element comprising a screw threaded into the shaft, and a non-circular head on the screw outwardly of the shaft; adjacent end portions of the wear sleeve sections having notches which register to define an opening formed to receive said head in non-turning relation whereby to prevent the wear sleeve from rotating on the shaft and the screw from turning in the shaft.

2. In a journal assembly which includes a shaft, a diametrally split wearing sleeve unit to fit on the shaft and removable therefrom, a locator element comprising a screw threaded in and projecting from the shaft, and a non-circular head on the screw; the unit having an opening therethrough to receive the head in non-turning relation.

JOHN W. WAKLEY.

References Cited in the file of this patent

UNITED STATES PATENTS

| Number | Name | Date |
|---|---|---|
| 165,397 | Williams | July 6, 1875 |
| 667,037 | Eschler | Jan. 29, 1901 |
| 966,726 | Yeager | Aug. 9, 1910 |
| 2,481,931 | Kester | Sept. 13, 1949 |

FOREIGN PATENTS

| Number | Country | Date |
|---|---|---|
| 104,066 | Australia | May 24, 1938 |
| 371,708 | Italy | June 1, 1939 |